(12) United States Patent
Sugimori et al.

(10) Patent No.: US 9,847,529 B2
(45) Date of Patent: Dec. 19, 2017

(54) NONAQUEOUS ELECTROLYTE SECONDARY BATTERY

(71) Applicant: SANYO Electric Co., Ltd., Daito-shi, Osaka (JP)

(72) Inventors: Masanori Sugimori, Hyogo (JP); Masanobu Takeuchi, Hyogo (JP); Katsunori Yanagida, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 304 days.

(21) Appl. No.: 14/780,941

(22) PCT Filed: Mar. 20, 2014

(86) PCT No.: PCT/JP2014/001626
§ 371 (c)(1),
(2) Date: Sep. 28, 2015

(87) PCT Pub. No.: WO2014/156095
PCT Pub. Date: Oct. 2, 2014

(65) Prior Publication Data
US 2016/0056471 A1 Feb. 25, 2016

(30) Foreign Application Priority Data
Mar. 29, 2013 (JP) ................. 2013-073254

(51) Int. Cl.
*H01M 4/62* (2006.01)
*H01M 4/13* (2010.01)
*H01M 4/02* (2006.01)

(52) U.S. Cl.
CPC ............ *H01M 4/622* (2013.01); *H01M 4/13* (2013.01); *H01M 2004/027* (2013.01)

(58) Field of Classification Search
CPC .................. H01M 4/13; H01M 4/622
(Continued)

(56) References Cited

U.S. PATENT DOCUMENTS

| 2008/0318133 A1 | 12/2008 | Matsuyama et al. |
| 2012/0328942 A1* | 12/2012 | Thomas-Alyea ..... H01M 4/587 429/211 |
| 2014/0127572 A1 | 5/2014 | Ozaki et al. |

FOREIGN PATENT DOCUMENTS

| CN | 101159324 A | 4/2008 |
| JP | 09-320569 A | 12/1997 |

(Continued)

OTHER PUBLICATIONS

Office Action dated Oct. 31, 2016, issued in counterpart Chinese Application No. 201480019257 (6 pages).
(Continued)

*Primary Examiner* — Basia A Ridley
*Assistant Examiner* — James M Erwin
(74) *Attorney, Agent, or Firm* — Westerman, Hattori, Daniels & Adrian, LLP

(57) ABSTRACT

A nonaqueous electrolyte secondary battery comprising a negative electrode plate including a negative electrode collector and a negative electrode mix layer which is placed on the negative electrode collector and which contains a negative electrode active material, a binder A containing a rubber polymer compound as a binder, and a binder B containing a water-soluble polymer compound. The negative electrode mix layer has a cross section in a thickness direction thereof, the cross section being halved into a collector-side region and a surface-side region. The sum of the perimeters of the negative electrode active material per unit area in the cross section is more distributed in the collector-side region than in the surface-side region. The binder A is more distributed in the collector-side region than in the surface-side region.

7 Claims, 2 Drawing Sheets

(58) Field of Classification Search
USPC .......................................................... 429/217
See application file for complete search history.

(56) References Cited

FOREIGN PATENT DOCUMENTS

| | | | |
|---|---|---|---|
| JP | 2003-077542 | A | 3/2003 |
| JP | 2005-071918 | A | 3/2005 |
| JP | 2006-210003 | A | 8/2006 |
| JP | 2009-004181 | A | 1/2009 |
| JP | 2011-019539 | A | 2/2011 |
| JP | 2011192539 | A | 9/2011 |
| JP | 2013-012391 | A | 1/2013 |
| WO | 2012/001814 | A1 | 1/2012 |

OTHER PUBLICATIONS

International Search Report dated Apr. 22, 2014, issued in counterpart Application No. PCT/JP2014/001626 (2 pages).

\* cited by examiner

US 9,847,529 B2

NONAQUEOUS ELECTROLYTE SECONDARY BATTERY

TECHNICAL FIELD

The present invention relates to a nonaqueous electrolyte secondary battery.

BACKGROUND ART

In recent years, nonaqueous electrolyte secondary batteries have been increasingly demanded in industries such as backup power sources and storages for renewable energy from solar power generation and wind power generation in light of issues such as unreliable electricity supply. In these fields, the nonaqueous electrolyte secondary batteries are required to have high capacity and a long life through large-current cycles.

Increasing the density of an electrode is known as a technique for achieving a battery with high capacity. Compression by pressing, dense packing by controlling the size and shape of an active material, and the like are performed. However, in the case of increasing pressed density by pressing, there is a problem in that a long life through large-current cycles is unlikely to be achieved because diffusion paths of lithium ions are reduced.

In order to achieve a long life through large-current cycles, the adhesion between a mix layer and collector of an electrode and the adhesion of an active material in the mix layer are preferably strong. However, this requires the amount of a binder to be increased. Therefore, the capacity of a battery may possibly be sacrificed.

As described above, high capacity and a long life through large-current cycles are often in a trade-off relationship. Therefore, electrodes are prepared by controlling the composition or structure of an active material, a conductive agent, or an additive such as a binder such that battery characteristics suitable for applications are obtained. For example, Patent Literatures 1 to 4 propose that plate properties are controlled using a plurality of active material layers.

However, recent nonaqueous electrolyte secondary batteries are required to have various properties and therefore proposals described in Patent Literatures 1 to 4 are insufficient.

CITATION LIST

Patent Literature

PTL 1: Japanese Published Unexamined Patent Application No. 9-320569
PTL 2: Japanese Published Unexamined Patent Application No. 2003-077542
PTL 3: Japanese Published Unexamined Patent Application No. 2009-004181
PTL 4: Japanese Published Unexamined Patent Application No. 2013-012391

SUMMARY OF INVENTION

Technical Problem

It is an object of the present invention to provide a nonaqueous electrolyte secondary battery having high capacity and a long life through large-current cycles.

Solution to Problem

A nonaqueous electrolyte secondary battery according to an embodiment of the present invention includes a negative electrode plate including a negative electrode collector and a negative electrode mix layer which is placed on the negative electrode collector and which contains a negative electrode active material, a binder A containing a rubber polymer compound as a binder, and a binder B containing a water-soluble polymer compound. The negative electrode mix layer has a cross section in a thickness direction thereof, the cross section being halved into a collector-side region and a surface-side region. The sum of the perimeters of the negative electrode active material per unit area in the cross section is more distributed in the collector-side region than in the surface-side region. The binder A is more distributed in the collector-side region than in the surface-side region.

Advantageous Effects of Invention

According to the present invention, a nonaqueous electrolyte secondary battery having high capacity and a long life through large-current cycles is provided.

DESCRIPTION OF EMBODIMENTS

Figure 1:
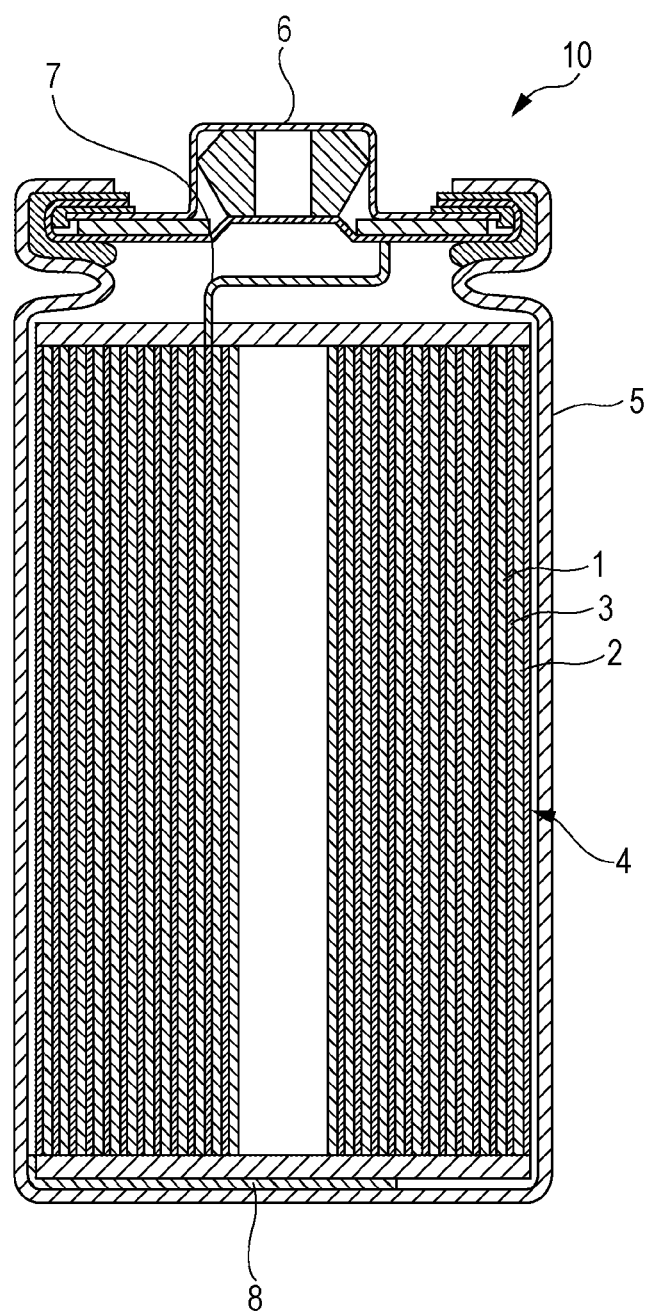
FIG. 1 is a schematic vertical sectional view showing the schematic structure of a cylindrical nonaqueous electrolyte secondary battery according to an embodiment of the present invention.

Embodiments of the present invention are described below. The embodiments are examples for carrying out the present invention. The present invention is not limited to the embodiments.

<Nonaqueous Electrolyte Secondary Battery>

A nonaqueous electrolyte secondary battery according to an embodiment includes a negative electrode plate including a negative electrode collector and negative electrode mix layers which are placed on the negative electrode collector and which contain a negative electrode active material, a binder A containing a rubber polymer compound as a binder, and a binder B containing a water-soluble polymer compound. Each negative electrode mix layer has a cross section in a thickness direction thereof, the cross section being halved into a collector-side region and a surface-side region. The sum of the perimeters of the negative electrode active material per unit area in the cross section is more distributed in the collector-side region than in the surface-side region. The binder A is more distributed in the collector-side region than in the surface-side region. The binder B is preferably present around the negative electrode active material. In the nonaqueous electrolyte secondary battery according to this embodiment, the adequate arrangement of the negative electrode active material and the binders allows a substantially uniform SEI coating to be formed in an electrode. This allows the nonaqueous electrolyte secondary battery to have high capacity and a long life through large-current cycles.

In the above configuration, the fact that the negative electrode active material located on the surface side of the negative electrode mix layer is unlikely to be densely packed and the shape of the negative electrode active material probably allow diffusion paths of lithium ions to be short, the lithium ions to be readily intercalated into and deintercalated from the negative electrode active material located on the collector side, and the deactivation of the lithium ions on the negative electrode active material to be suppressed when charge or discharge is performed at a large current.

Groups of the negative electrode active material located on the collector side are densely packed, the sum of the perimeters of the groups being large, whereby high capacity is achieved. Since the binder A has liquid-holding capacity, an electrolyte solution is probably held in an electrode even in such a state that the negative electrode active material is expanded during charge and the volume of voids is significantly reduced.

That is, in the nonaqueous electrolyte secondary battery, an SEI coating which deactivates and stabilizes the negative electrode active material is formed by the reductive degradation of the electrolyte solution. When the sum of the perimeters of the negative electrode active material is large, there are many interfaces with the electrolyte solution. Therefore, in order to obtain a substantially uniform coating, a large amount of the electrolyte solution is necessary. Thus, the binder A, which has high liquid-holding capacity, is graded in accordance with the sum of the perimeters of the negative electrode active material, whereby the nonuniform formation of SEI coatings on the surface side and the collector side is suppressed and the deactivation of the lithium ions is also suppressed. Hence, cycle characteristics can be probably enhanced.

The nonaqueous electrolyte secondary battery according to this embodiment is extremely important in industrial applications for long-term use.

The sum of the perimeters of the negative electrode active material is the sum of the lengths of edge portions of cross sections of individual particles of the negative electrode active material per unit area in the cross section of the negative electrode mix layer. The sum of the perimeters of the negative electrode active material can be determined by image analysis using, for example, a cross-sectional SEM image. That is, a cross-sectional SEM image of the negative electrode mix layer is taken in a thickness direction thereof and the perimeters of the negative electrode active material particles observed per unit area in the cross-sectional SEM image are obtained and are then summed. The abundance ratio thereof can be determined by halving the negative electrode mix layer into the surface-side region and the collector-side region. In order to obtain an effect of this configuration, the sum of the perimeters of the negative electrode active material observed in the collector-side region is preferably 60% or more of the total amount of the negative electrode active material in the negative electrode mix layer and more preferably 70% or more.

The negative electrode active material is not particularly limited and may be one capable of storing and releasing lithium. For example, a carbon material, a metal or alloying material alloying with lithium, a metal oxide, or the like can be used as the negative electrode active material.

Examples of a particular way to increase the sum of the perimeters of the negative electrode active material located on the collector side to reduce the sum of the perimeters of the negative electrode active material located on the surface side include the use of the massive or scaly material for the negative electrode active material on the collector side, an increase in specific surface area by downsizing or surface reforming, a method in which the particle size distribution of the negative electrode active material is adjusted such that the negative electrode active material is likely to be geometrically packed, the use of a material with a small aspect ratio on the surface side, and the use of a spherically processed material.

The negative electrode mix layers can be formed in such a manner that, for example, collector-side negative electrode slurry is prepared by mixing the negative electrode active material in which the sum of the perimeters is large, the binder A of which the amount is larger than that on the surface side, the binder B, and a solvent such as water together; surface-side negative electrode slurry is prepared by mixing the negative electrode active material in which the sum of the perimeters is small, the binder A of which the amount is smaller than that on the collector side, the binder B, and a solvent such as water together; the collector-side negative electrode slurry is applied to both surfaces of the negative electrode collector and is dried; and the surface-side negative electrode slurry is applied to layers of the collector-side negative electrode slurry and is then dried. In this manner, the amounts of the binders A and B are discontinuously varied. However, the amounts of the binders A and B may be continuously varied in such a manner that layers of the surface-side negative electrode slurry are formed before the collector-side negative electrode slurry layers are completely dried.

For example, a shape factor of the negative electrode active material particles that is represented by an equation below is adjusted to the range of 1.0 to less than 2.8 in the surface-side region and the range of 2.8 to 10 in the collector-side region. The shape factor can be determined using image analysis software (mage-Pro Plus Ver. 4.0 (developed by Olanetron) or the like). The negative electrode active material particles observed per unit area in a cross section of each negative electrode mix layer are measured for maximum length (L) and projected area (A) and values are calculated from the equation below and are averaged, whereby the shape factor is determined.

$$\text{Shape factor} = (L^2/A) \times (\pi/4)$$

where L represents the maximum length (μm) of the negative electrode active material particles and A represents the projected area (μm$^2$) of the negative electrode active material particles.

The use of a carbon material is suitable for obtaining this configuration because the carbon material can be used in various forms and has a rich track record in industrial processing. Examples of the carbon material include natural graphite, synthetic graphite, mesophase pitch carbon fiber (MCF), meso-carbon micro-beads (MCMBs), coke, and hard carbon. That is, spherical graphite such as MCMBs and non-spherical graphite such as massive or scaly graphite are preferably used on the surface side and the collector side, respectively. In particular, massive graphite with a shape factor of 2.8 to 5 is preferably used on the collector side.

The binder A, which contains the rubber polymer compound, is not particularly limited and may be an elastic polymer compound. The following binders can be used alone or in combination as the binder A: rubber binders such as styrene-butadiene rubber, high-styrene rubber, ethylene-propylene rubber, butyl rubber, chloroprene rubber, butadiene rubber, isoprene rubber, acrylonitrile-butadiene rubber, acrylonitrile rubber, fluoro-rubber, acrylic rubber, and silicone rubber.

The mass of the binder A preferably accounts for 0.5% to 2% by mass of the mass of the negative electrode mix layer. The amount of the binder A present in the collector-side region is preferably 60% or more of the total amount of the binder A present in the negative electrode mix layer and more preferably 70% or more. The upper limit of the ratio of the amount of the binder A present in the collector-side region to the total amount of the binder A present in the negative electrode mix layer is not particularly limited. This is because even if 100% of the binder A is present in the collector-side region, that is, even if 0% of the binder A is present in the surface-side region, necessary binding force is ensured by the binder B and the electrolyte solution is likely to flow through a separator or the like since many voids are present in the surface-side region.

The following method is known as a method for determining the binder A: a method in which a cross section of the negative electrode plate is prepared with a cross-section polisher and is dyed with a dye such as osmium tetroxide and the binder A is then detected with an electron probe micro-analyzer (abbreviated as EPMA), an energy dispersive X-ray spectroscopy (abbreviated as EDX or EDS), or the like.

The binder B, which contains the water-soluble polymer compound, is not particularly limited and may be a polymer compound which is water-soluble. A polymeric water-soluble polymer compound (hereinafter referred to as "polymeric compound") and a polysaccharide water-soluble polymer compound (hereinafter referred to as "polysaccharide compound") can be used alone or in combination as the binder B. Polyvinyl alcohol, polyvinylpyrrolidone, polyethylene oxide, derivatives thereof, and the like can be used as the polymeric compound. Cellulose, carboxymethylcellulose, or the like can be used as the polysaccharide compound. In particular, carboxymethylcellulose is preferred from the viewpoint of electrochemical stability. The mass of the binder B preferably accounts for 0.5% to 2% by mass of the mass of the negative electrode mix layer.

In order to ensure the adhesion of the negative electrode active material in the negative electrode mix layer and in order to uniformly form an SEI coating, the binder B is preferably present around the negative electrode active material.

A lithium transition metal composite oxide containing cobalt, nickel, manganese, aluminium, or the like as a transition metal or the like is cited as a positive electrode active material. Examples of the lithium transition metal composite oxide containing cobalt, nickel, manganese, aluminium, or the like include lithium-cobalt composite oxides, lithium-nickel composite oxides, lithium-nickel-cobalt composite oxides, lithium-nickel-cobalt-aluminium composite oxides, and lithium-nickel-cobalt-manganese composite oxides.

The type of the lithium transition metal oxide is not limited to those described above. The lithium transition metal oxide may be a lithium transition metal oxide, represented by the formula LIMePO$_4$ (Me is at least one selected from the group consisting of Fe, Ni, Co, and Mn), having an olivine structure; a lithium transition metal oxide, represented by the formula LiMe$_2$O$_4$ (Me is at least one selected from the group consisting of Fe, Ni, Co, and Mn), having a spinel structure; or the like. The lithium transition metal oxide may further contain at least one selected from the group consisting of magnesium, aluminium, titanium, chromium, vanadium, iron, copper, zinc, niobium, molybdenum, zirconium, tin, tungsten, sodium, and potassium.

A solvent for a nonaqueous electrolyte is not particularly limited and may be a solvent conventionally used in non-aqueous electrolyte secondary batteries. The following compounds can be used: for example, cyclic carbonates such as ethylene carbonate, propylene carbonate, butylene carbonate, and vinylene carbonate; linear carbonates such as dimethyl carbonate, ethyl methyl carbonate, and diethyl carbonate; compounds including esters such as methyl acetate, ethyl acetate, propyl acetate, methyl propionate, ethyl propionate, and γ-butyrolactone; sulfo group-containing compounds such as propanesultone; compounds including ethers such as 1,2-dimethoxyethane, 1,2-diethoxyethane, tetrahydrofuran, 1,2-dioxane, 1,4-dioxane, and 2-methyltetrahydrofuran; compounds including nitriles such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and compounds including amides such as dimethylformamide. In particular, solvents in which H is partly substituted with F are preferably used. These compounds may be used alone or in combination. In particular, the following solvents are preferred: a solvent containing a cyclic carbonate and a linear carbonate in combination and a solvent containing the cyclic carbonate, the linear carbonate, a small amount of a nitrile-containing compound, and a small amount of an ether-containing compound in combination.

An ionic liquid can be used as a nonaqueous solvent for the nonaqueous electrolyte. In this case, a cation species and an anion species are not particularly limited. From the viewpoint of low viscosity, electrochemical stability, and hydrophobicity, a combination of a cation such as a pyridinium cation, an imidazolium cation, or a quaternary ammonium cation and an anion such as a fluorine-containing imide anion is particularly preferred.

Furthermore, a known lithium salt commonly used in conventional nonaqueous electrolyte secondary batteries can be used as a solute used in the nonaqueous electrolyte. A lithium salt containing one or more of P, B, F, O, S, N, and Cl can be used as the lithium salt. In particular, LiPF$_6$, LiBF$_6$, LiCF$_3$SO$_3$, LiN(FSO$_2$)$_2$, LiN(CF$_3$SO$_2$)$_2$, LiN(C$_2$F$_5$SO$_2$)$_2$, LiN(CF$_3$SO$_2$)(C$_4$F$_9$SO$_2$), LiC(C$_2$F$_5$SO$_2$)$_3$, LiAsF$_6$, LiClO$_4$, and mixtures of these salts can be used as the lithium salt. In order to enhance the durability and charge/discharge characteristics of the nonaqueous electrolyte secondary battery, LiPF$_6$ is preferably used.

A conventional separator can be used as a separator. In particular, a separator containing polyethylene, a separator including a polyethylene layer and a polypropylene-containing layer formed thereon, or a polyethylene separator having a surface coated with an aramide resin or the like may be used.

Layers containing conventional inorganic filler may be each formed at the interface between a positive electrode and the separator and the interface between a negative electrode and the separator. A conventional oxide or phosphate compound containing one or more of titanium, aluminium, silicon, magnesium, and the like or one surface-treated with a hydroxide or the like can be used as the filler. The following method can be used to form the filler layers: a method in which filler-containing slurry is directly applied to the positive electrode, the negative electrode, or the separator; a method in which a sheet formed from filler is attached to the positive electrode, the negative electrode, or the separator; or the like.

As described above, according to this embodiment, a nonaqueous electrolyte secondary battery having high capacity and a long life through large-current cycles can be provided.

The nonaqueous electrolyte secondary battery according to this embodiment can be expected to be used in, for example, industrial power sources such as driving power sources, required to have high power, for electric vehicles, HEVs, and electric tools; storages for renewable energy from solar power generation and wind power generation; and backup power sources, the industrial power sources being required to have a long life.

EXAMPLES

For embodiments for carrying out the present invention, the present invention is further described below in detail with reference to experiment examples. The present invention is not limited to the experiment examples. Various modifications can be made without departing from the scope of the present invention.

Experiment Example 1

[Preparation of Positive Electrode]

With 94 parts by mass of particles of lithium nickel-cobalt-manganate, represented by the formula $LiNi_{0.5}Co_{0.2}Mn_{0.3}O_2$, used as a positive electrode active material, 4 parts by mass of carbon black used as a carbon conductive agent and 2 parts by mass of polyvinylidene fluoride used as a binder were mixed, followed by adding an adequate amount of NMP (N-methyl-2-pyrrolidone), whereby positive electrode slurry was prepared. Next, the positive electrode slurry was applied to both surfaces of a positive electrode collector containing aluminium and was dried. The positive electrode collector was rolled using a roller and was cut to a predetermined electrode size, followed by attaching a positive electrode lead to the positive electrode collector, whereby a positive electrode was prepared.

[Preparation of Negative Electrode]

The following materials were mixed together: 100 parts by mass of a massive graphite powder in which the sum of the perimeters was large and which was used as a negative electrode active material in a collector-side region containing a large amount of a binder A, 1 part by mass of carboxymethylcellulose (CMC) that was a binder B, and water. The mixture was mixed with 1.5 parts by mass of styrene-butadiene rubber (SBR) that was the binder A and water, whereby negative electrode slurry (1) was prepared. That is, the mass ratio of the graphite powder to CMC to SBR was 100:1:1.5.

The following materials were mixed together: 100 parts by mass of meso-carbon micro-beads (MCMBs) of which the sum of the perimeters was large, which were used as a negative electrode active material in a surface-side region containing a small amount of the binder A, and which were spherical graphite; 1 part by mass of carboxymethylcellulose (CMC) that was the binder B, and water. The mixture was mixed with 0.5 parts by mass of styrene-butadiene rubber (SBR) that was the binder A and water, whereby negative electrode slurry (2) was prepared. That is, the mass ratio of the MCMBs to CMC to SBR was 100:1:0.5.

Next, the negative electrode slurry (1) was applied to both surfaces of a negative electrode collector, made from copper foil, having a thickness of 12 μm and was then dried. Thereafter, the negative electrode slurry (2) was applied to layers of the negative electrode slurry (1) on the both surfaces and was then dried.

In this operation, the mass of the negative electrode active material contained in the layers of the negative electrode slurry (1) was the same as the mass of the negative electrode active material contained in layers of the negative electrode slurry (2). That is, in the whole of negative electrode mix layers, the composition ratio of the graphite powder to the MCMBs to CMC to SBR was 50:50:1:1.

The negative electrode collector was rolled using a roller and was cut to a predetermined electrode size, followed by attaching a negative electrode lead to the negative electrode collector, whereby a negative electrode plate was prepared.

[Preparation of Nonaqueous Electrolyte Solution]

To a solvent mixture prepared by mixing EC (ethylene carbonate), DMC (dimethyl carbonate), and EMC (ethyl methyl carbonate) at a volume ratio of 25:65:10, 5% by mass of FEC (fluoroethylene carbonate) was added, followed by dissolving 1.2 mol/L of $LiPF_6$ as a solute, whereby a nonaqueous electrolyte solution was prepared.

[Preparation of Battery]

After the positive electrode and the negative electrode were placed opposite to each other with a separator including a microporous membrane made of polyethylene therebetween, the positive electrode, the negative electrode, and the separator were spirally wound around a winding core. Next, the winding core was pulled out, whereby a spiral electrode assembly was prepared. After the electrode assembly was provided in an enclosure made of metal, the nonaqueous electrolyte solution was poured into the enclosure and the enclosure was then sealed, whereby a 18650-type nonaqueous electrolyte secondary battery (a capacity of 2.0 Ah (4.2 V to 2.75 V measurement conditions)) having a diameter of 18 mm and a height of 65 mm was prepared. The battery prepared as described above is hereinafter referred to as Battery A1.

Figure 2:
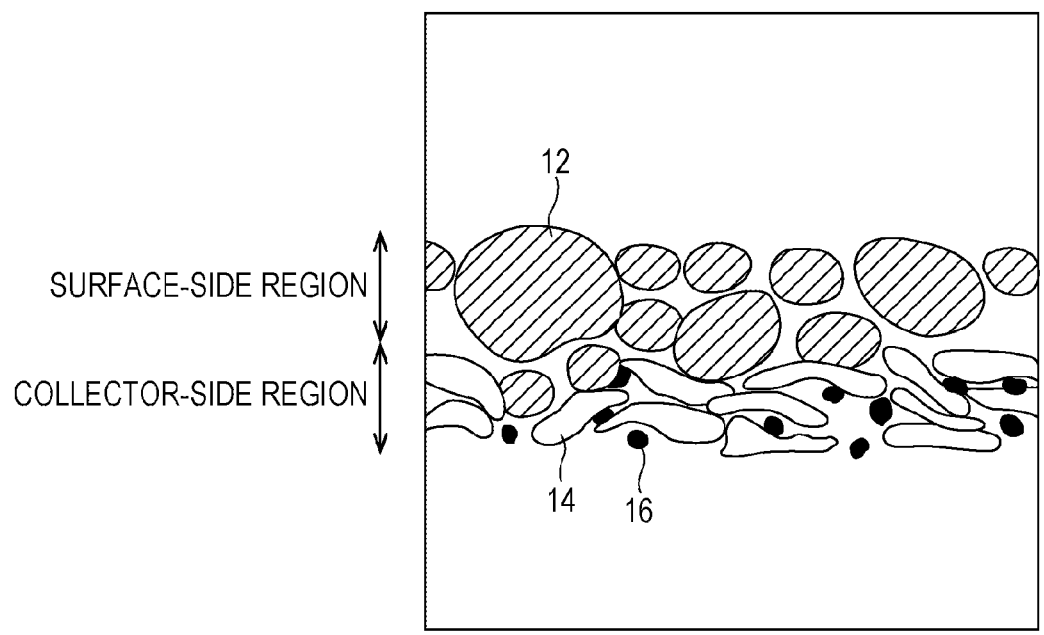
FIG. 2 is a schematic sectional view of a negative electrode mix layer of Experiment Example 1.

FIG. 1 is a schematic sectional view of the nonaqueous electrolyte secondary battery 10 prepared as described above. Reference numeral 1 represents the positive electrode, reference numeral 2 represents the negative electrode, reference numeral 3 represents the separator, reference numeral 4 represents the electrode assembly, reference numeral 5 represents the negative electrode can, reference numeral 6 represents a sealing member, reference numeral 7 represents the positive electrode collector, and reference numeral 8 represents the negative electrode collector. FIG. 2 is a schematic sectional view of a negative electrode mix layer. Referring to FIG. 2, reference numeral 12 represents MCMBs that are spherical graphite, reference numeral 14 represents massive graphite, and reference numeral 16 represents SBR that is the binder A.

Experiment Example 2

A nonaqueous electrolyte secondary battery was prepared in substantially the same manner as that described in Experiment Example 1 except that negative electrode slurry (1) prepared using 100 parts by mass of a massive graphite powder as a negative electrode active material was used and negative electrode slurry (2) prepared using 100 parts by mass of the massive graphite powder as a negative electrode active material was used. The battery prepared as described above is hereinafter referred to as Battery A2.

Experiment Example 3

A nonaqueous electrolyte secondary battery was prepared in substantially the same manner as that described in Experiment Example 1 except that negative electrode slurry (1) prepared using 100 parts by mass of MCMBs as a negative electrode active material was used and negative electrode slurry (2) prepared using 100 parts by mass of the MCMBs as a negative electrode active material was used. The battery prepared as described above is hereinafter referred to as Battery A3.

Experiment Example 4

A nonaqueous electrolyte secondary battery was prepared in substantially the same manner as that described in Experiment Example 1 except that negative electrode slurry (1) was prepared using 1 part by mass of styrene-butadiene rubber (SBR) and negative electrode slurry (2) was prepared using 1 part by mass of styrene-butadiene rubber (SBR). The battery prepared as described above is hereinafter referred to as Battery A4.

Experiment Example 5

Figure 3:
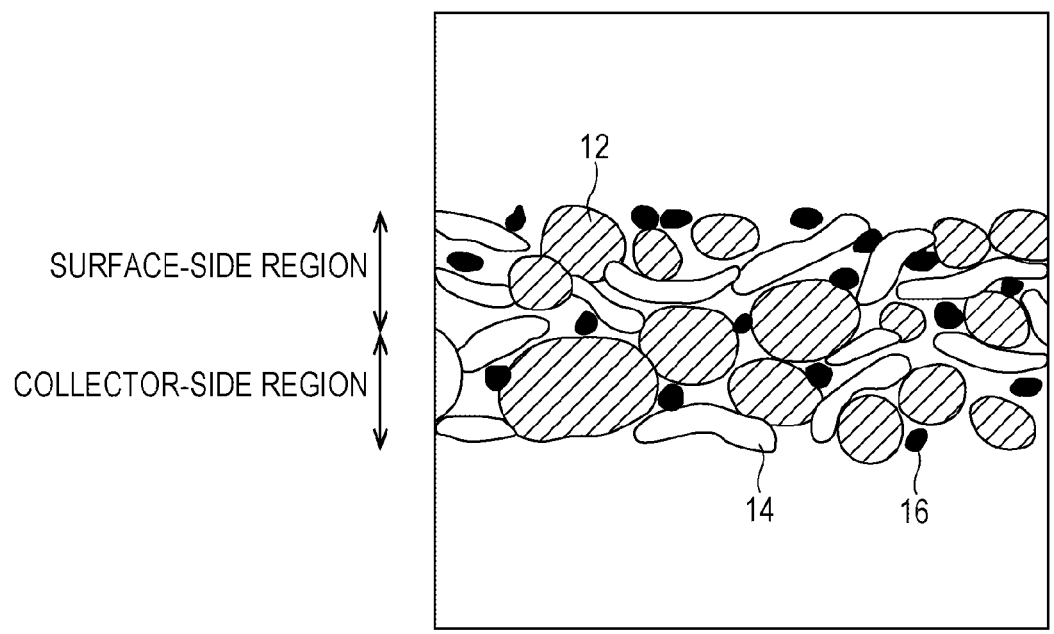
FIG. 3 is a schematic sectional view of a negative electrode mix layer of Experiment Example 5.

The following materials were mixed together: 50 parts by mass of a massive graphite powder, 50 parts by mass of meso-carbon micro-beads (MCMBs), 1 part by mass of carboxymethylcellulose (CMC) that was a binder B, and water. The mixture was mixed with 1 part by mass of styrene-butadiene rubber (SBR) that was a binder A and water, whereby negative electrode slurry (3) was prepared. That is, the mass ratio of the graphite powder to the MCMBs to CMC to SBR was 50:50:1:1. The negative electrode slurry (3) was applied to both surfaces of a negative electrode collector, made from copper foil, having a thickness of 12 μm such that the amount of the applied negative electrode slurry (3) was the same as the sum of the amounts of the applied negative electrode slurries (1) and (2) used in Experiment Example 1. The applied negative electrode slurry (3) was dried. Thereafter, a 18650 battery was prepared in the same manner as that described in Experiment Example 1. The battery prepared as described above is hereinafter referred to as Battery A5. FIG. 3 is a schematic sectional view of a negative electrode mix layer.

Experiment Example 6

The following materials were mixed together: 100 parts by mass of a massive graphite powder, 1 part by mass of carboxymethylcellulose (CMC) that was a binder B, and water. The mixture was mixed with 1 part by mass of styrene-butadiene rubber (SBR) that was a binder A and water, whereby negative electrode slurry (4) was prepared. The negative electrode slurry (4) was applied to both surfaces of a negative electrode collector, made from copper foil, having a thickness of 12 μm such that the amount of the applied negative electrode slurry (4) was the same as the sum of the amounts of the applied negative electrode slurries (1) and (2) used in Experiment Example 1. The applied negative electrode slurry (4) was dried. Thereafter, a 18650 battery was prepared in the same manner as that described in Experiment Example 1. The battery prepared as described above is hereinafter referred to as Battery A6.

(Experiments)

[Power Retention]

Batteries A1 to A6 were charged and discharged for 500 cycles under conditions below, whereby the power retention given by Equation (1) below was determined. The results were shown in Table 1.

<Charge/Discharge Conditions>

Constant-current charge was performed at a charge current of 1.6 lt (3.2 A) under 25° C. temperature conditions until the voltage of each battery reached 4.1 V. Furthermore, constant-voltage charge was performed at a constant voltage of 4.1 V until the current of the battery reached 0.016 lt (0.032 A). Next, for each cell, constant-current discharge was performed at a discharge current of 1.6 lt (3.2 A) until the voltage reached 3.0 V.

$$\text{Power retention} = (\text{amount of discharged power in 500th cycle/amount of discharged power in first cycle}) \times 100 \quad (1)$$

[Condition Analysis]

The negative electrode plates of Batteries A1 to A6 were analyzed for condition. A cross section of each negative electrode plate was prepared with a cross-section polisher (manufactured by JEOL Ltd.). The cross section was observed with a scanning electron microscope (abbreviated as SEM) and a 500× magnification image thereof was obtained. Next, a portion of each negative electrode mix layer was pulled out and was halved in a thickness direction of the negative electrode mix layer and an image of a surface-side region and an image of a collector-side region were prepared. The obtained images of the surface-side and collector-side regions had a height (thickness) of about 30 μm and a width of about 120 μm. The images were analyzed with the analysis software Image-Pro Plus Ver. 4.0 (developed by Olanetron) and the perimeter of each particle of the negative electrode active material was determined. The sum of the perimeters of the negative electrode active material was determined and the abundance ratio of the perimeter of the negative electrode active material in the same area was calculated. The obtained abundance ratio of the perimeter was shown in Table 1. The average shape factor of the negative electrode active material particles in the surface-side region and the average shape factor of the negative electrode active material particles in the collector-side region were calculated and were shown in Table 1. Furthermore, the content of SBR in the same area of each of the surface-side region and the collector-side region was determined and the abundance ratio of SBR to the whole negative electrode mix layer was calculated. The content and abundance ratio thereof were shown in Table 1.

TABLE 1

| | Battery | Type of active material | Amount of binder A (SBR) | | Perimeter abundance ratio | | Average shape factor | | Power retention (%) |
|---|---|---|---|---|---|---|---|---|---|
| | | | Surface side (%) | Collector side (%) | Surface side (%) | Collector side (%) | Surface side (%) | Collector side (%) | |
| Experiment Example 1 | A1 | A large amount of MCMBs on the surface side. A large amount of massive graphite on the collector side. | 40 | 60 | 30 | 70 | 2.7 | 3.3 | 92.8 |

TABLE 1-continued

| | Battery | Type of active material | Amount of binder A (SBR) Surface side (%) | Amount of binder A (SBR) Collector side (%) | Perimeter abundance ratio Surface side (%) | Perimeter abundance ratio Collector side (%) | Average shape factor Surface side (%) | Average shape factor Collector side (%) | Power retention (%) |
|---|---|---|---|---|---|---|---|---|---|
| Experiment Example 2 | A2 | Massive graphite | 39 | 61 | 52 | 48 | 3.2 | 3.2 | 90.4 |
| Experiment Example 3 | A3 | MCMBs | — | — | — | — | — | — | Unmeasurable in 500th cycle |
| Experiment Example 4 | A4 | A large amount of MCMBs on the surface side. A large amount of massive graphite on the collector side. | 62 | 38 | 31 | 69 | 2.6 | 3.3 | 90.6 |
| Experiment Example 5 | A5 | Mixture of MCMBs and massive graphite | 63 | 37 | 56 | 44 | 3.2 | 3.2 | 87.8 |
| Experiment Example 6 | A6 | Massive graphite | 62 | 38 | 57 | 43 | 3.0 | 3.0 | 89.7 |

As is clear from Table 1, Battery A1 of Experiment Example 1 has higher power retention as compared to Batteries A2 to A6 of Experiment Examples 2 to 6. Adjusting the abundance ratio of the negative electrode active material and styrene-butadiene rubber (SBR), which is the binder A, probably suppresses deterioration in large-current cycles.

The reason for this is unclear and is probably as follows: in Battery A1 of Experiment Example 1, the MCMBs placed in the surface-side region are unlikely to be packed, migration paths of lithium ions that are necessary for the charge/discharge of massive graphite placed on the collector side are ensured due to the shape thereof, and a large amount of styrene-butadiene rubber (SBR) placed on the collector side holds the electrolyte solution; hence, the electrolyte solution, which is necessary for the formation of SEI coatings and the intercalation or deintercalation of the lithium ions, can be held even when an active material is expanded in substantially a charged state. Furthermore, the SEI coatings are substantially uniformly formed on the negative electrode active material and the deactivation of the lithium ions is suppressed; hence, deterioration in cycles is probably suppressed.

On the other hand, in comparisons between Experiment Examples 2 to 6, Batteries A2 and A4 have characteristics not enhanced from those of Battery A6. This is probably because Battery A2 has substantially the same lithium ion diffusion paths on the surface side as those of Battery A6 and is insufficient in the diffusion of lithium ions; Battery A4 has shorter lithium ion diffusion paths on the surface side as compared to Battery A6, contains a small amount of SBR on the collector side, and is insufficient to hold the electrolyte solution; and therefore battery characteristics are not enhanced. Batteries A3 and A5 have inferior characteristics because of an increase in resistance due to insufficient conductivity.

In Battery A1 of Experiment Example 1, the amounts of the binders A and B are discontinuously varied. The amounts of the binders A and B may be continuously varied.

INDUSTRIAL APPLICABILITY

A cylindrical nonaqueous electrolyte secondary battery according to an aspect of the present invention can be used in, for example, driving power sources for mobile data terminals such as mobile phones, notebook personal computers, and tablet personal computers and particularly in applications required have high energy density. The flat nonaqueous electrolyte secondary battery can be expected to be used in high-power applications such as electric vehicles (EVs), hybrid electric vehicles (HEVs, PHEVs), and electric tools.

| Reference Signs List | |
|---|---|
| 1 | Positive electrode |
| 2 | Negative electrode |
| 3 | Separator |
| 4 | Electrode assembly |
| 5 | Negative electrode can |
| 6 | Sealing member |
| 7 | Positive electrode collector |
| 8 | Negative electrode collector |
| 10 | Nonaqueous electrolyte secondary battery |
| 12 | MCMBs |
| 14 | Massive graphite |
| 16 | SBR |

The invention claimed is:

1. A nonaqueous electrolyte secondary battery, comprising:
    a negative electrode plate comprising
        a negative electrode collector, and
        a negative electrode mix layer on the negative electrode collector,
    wherein the negative electrode mix layer comprises
        a negative electrode active material, and
        a binder A comprising a rubber polymer compound,
    wherein, when viewed in a cross-section in a thickness direction, the negative electrode mix layer is halved into a collector-side region and a surface-side region;
    wherein, when viewed in the cross-section in the thickness direction, a sum of perimeters of particles of the negative electrode active material in the collector-side region, per unit area in the cross section, is greater than a sum of perimeters of particles of the negative electrode active material in the surface-side region, per unit area in the cross section, and
    wherein more of the binder A is distributed in the collector-side region than in the surface-side region.

2. The nonaqueous electrolyte secondary battery according to claim 1, wherein, when viewed in the cross-section in the thickness direction, the sum of the perimeters of the particles the negative electrode active material in the collector-side region is 60% or more of the sum of the perimeters of the particles of the negative electrode active material in an entirety of the negative electrode mix layer.

3. The nonaqueous electrolyte secondary battery according to claim 1, wherein an amount of the binder A in the collector-side region is 60% or more of an amount of the binder A in an entirety of the negative electrode mix layer.

4. The nonaqueous electrolyte secondary battery according to claim 1, wherein the negative electrode mix layer further comprises a binder B comprising a water-soluble polymer compound.

5. The nonaqueous electrolyte secondary battery according to claim 4, wherein the water-soluble polymer compound is carboxymethylcellulose.

6. The nonaqueous electrolyte secondary battery according to claim 1, wherein the particles of the negative electrode active material in the collector-side region have an average shape factor of greater than or equal to 2.8 to less than or equal to 10.

7. The nonaqueous electrolyte secondary battery according to claim 1, wherein the particles of the negative electrode active material in the surface-side region have an average shape factor of greater than or equal to 1.0 and less than 2.8.

* * * * *